(12) United States Patent
Fujimoto et al.

(10) Patent No.: US 7,418,783 B2
(45) Date of Patent: Sep. 2, 2008

(54) CLAMPING MECHANISM FOR TOOL HOLDER

(75) Inventors: Akihiko Fujimoto, Yamanashi (JP); Norio Watanabe, Fujiyoshida (JP); Masahiro Murota, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 413 days.

(21) Appl. No.: 11/216,091

(22) Filed: Sep. 1, 2005

(65) Prior Publication Data
US 2006/0045644 A1 Mar. 2, 2006

(30) Foreign Application Priority Data
Sep. 1, 2004 (JP) ............... 2004-254232

(51) Int. Cl.
*B23C 5/26* (2006.01)
*B23P 23/00* (2006.01)
(52) U.S. Cl. ................. 29/896.9; 409/141; 409/233
(58) Field of Classification Search ........... 409/233, 409/231–232, 141; 408/239 R, 239 A, 143; 29/896.9, 896.93
See application file for complete search history.

(56) References Cited

U.S. PATENT DOCUMENTS

| | | | | | |
|---|---|---|---|---|---|
| 3,875,848 | A | * | 4/1975 | Powell | ............... 409/233 |
| 4,605,349 | A | * | 8/1986 | Bone | ............... 409/141 |
| 4,836,723 | A | | 6/1989 | Flammini | |
| 4,986,704 | A | * | 1/1991 | Narushima et al. | ........ 409/233 |
| 6,238,152 | B1 | | 5/2001 | Fujimoto et al. | |

FOREIGN PATENT DOCUMENTS

| | | |
|---|---|---|
| DE | 196 18 610 | 11/1996 |
| EP | 1 044 748 | 10/2000 |
| GB | 920879 | 3/1963 |
| JP | 54-113580 A * | 9/1979 |
| JP | 5-63701 | 8/1993 |
| JP | 3033403 U | 10/1996 |
| JP | 10-118815 | 5/1998 |
| JP | 2000-052104 | 2/2000 |
| JP | 2000-246573 A * | 9/2000 |
| JP | 2000-296404 | 10/2000 |
| JP | 2002-86304 | 3/2002 |
| JP | 2003-016140 | 1/2003 |

OTHER PUBLICATIONS

Machine Translation of DE-19618610-A.*
Machine Translation of JP-05-063701-U.*
Machine Translation of JP-2002-086304-A.*

(Continued)

*Primary Examiner*—Erica E Cadugan
(74) *Attorney, Agent, or Firm*—Staas & Halsey LLP

(57) ABSTRACT

For a spring sliding on the drawbar, the coil spring is used; the removal work for keeping the inner diameters of the coil springs aligned is performed such that the clearance between the outer diameter of the drawbar and the inner diameter of the coil spring becomes a minimum; and the coil springs are caused to be guided integrally with the drawbar. By doing so, the movement of the center of gravity of the spring that is caused by repeated rotational operation of the main spindle or repeated tool clamping operation will be reduced and the amplitude by vibration will be made smaller.

12 Claims, 3 Drawing Sheets

OTHER PUBLICATIONS

Full text translation of JP 3033403 U.*
Full text translation of JP 2000-052104.*
Partial European Search Report and Annex of Application No. EP 05 25 5311 dated Dec. 22, 2005.
European Search Report and Annex dated May 9, 2006 of Application No. EP 05 25 5311.
Japanese Patent Office Action, mailed Mar. 4, 2008 and issued in Japanese Patent Application No. 2004-254232.

* cited by examiner

FIG. 2
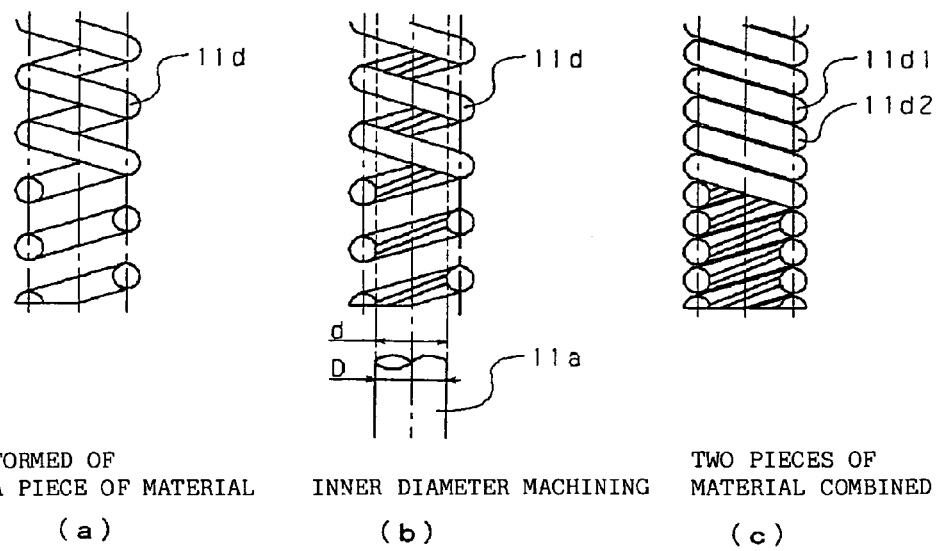
FORMED OF
A PIECE OF MATERIAL
(a)
INNER DIAMETER MACHINING
(b)
TWO PIECES OF
MATERIAL COMBINED
(c)
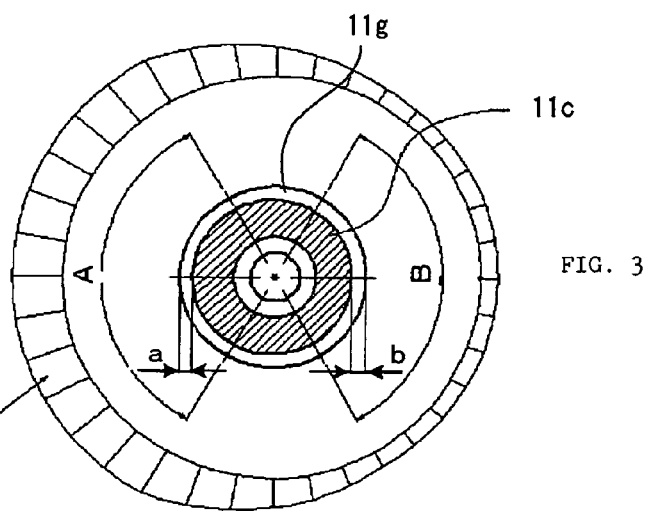
PRESSURE
DISTRIBUTION OF
O-RING
FIG. 3
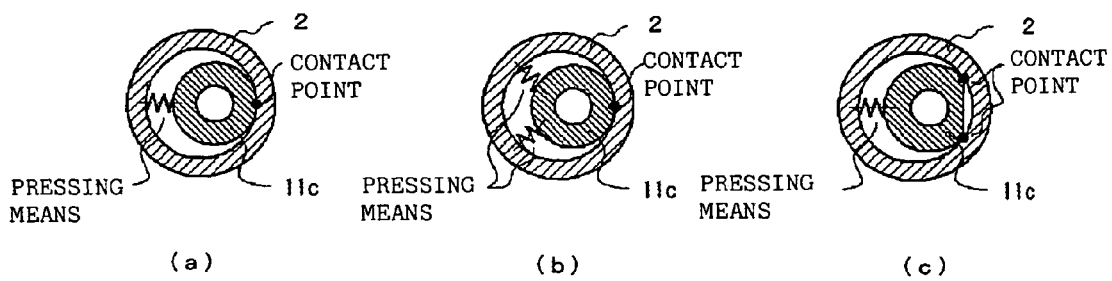
(a)　　　(b)　　　(c)
FIG. 4

CLAMPING MECHANISM FOR TOOL HOLDER

BACKGROUND OF THE INVENTION

1. Field of the Invention

The present invention relates to a clamping mechanism for a tool holder.

2. Description of the Related Art

Year after year, in order to improve machining efficiency, revolution speed of the main spindle of a machine tool has become faster, and it has become a common practice to exceed 20,000 rpm in maximum speed. In such a main spindle at high speed revolution, how low vibration during the main spindle revolution can be kept in terms of noise, reliability and machining precision becomes important.

As the main spindle speed becomes faster, the structure capable of keeping rotational vibration of the main spindle low has been requested even for a tool clamping mechanism to be provided within the main spindle.

FIG. 5 is a view showing a structural example of a main spindle mechanism using a conventionally-known clamping mechanism. In FIG. 5, a clamping mechanism 1 (1a to 1e) is provided within a main spindle 2. The main spindle 2 is rotatably mounted on a housing 5 via a bearing 6.

The clamping mechanism 1 is composed of: a drawbar 1a; a steel ball 1b; a nut 1c coupled to the drawbar 1a; a seat plate 1d and a disk spring 1e.

The tool holder is composed of the main body 4a of a tool holder for holding a tool such as a cutter 4b, a pull stud 4c, and a tool shank 4d. The tool shank 4d is inserted into an end portion open end of the main spindle 2 by an automatic tool exchanger and the steel ball 1b is extended by the pull stud 4c at the upper end to thereby mount the tool.

The clamping mechanism 1 is capable of assuming two states: a tool holding state for holding the main body 4a of tool holder; and an unclamped state in which the tool holder has been unclamped. The clamping mechanism 1 draws, in the tool holding state, the main body 4a of tool holder into the main spindle 2 side for holding by transmitting a repulsion force of the disk spring 1e compressed to the pull stud 4c via the nut 1c, the drawbar 1a and the steel ball 1b.

Also, when unclamping the main body 4a of tool holder, a roller 7 is operated and a ring 3b coupled to the nut 1c via a rod 3a is pressed down against the repulsion force of the disk spring 1e. Thereby the nut 1c, the drawbar 1a and the steel ball 1b advance (descend) together, and the steel ball 1b moves to an air gap 2a within the main spindle 2 to unclamp the pull stud 4c.

Such conventional structure as described above presents no problem particularly when the revolution speed of the main spindle is comparatively low, but when the main spindle speed reaches such high speed revolution as to exceed 20,000 rpm, a problem that the rotational vibrations (vibration acceleration, vibration amplitude) could not be kept low has come to the surface.

As a main cause for vibrations during revolution of the main spindle, assembly precision of the main spindle including the bearing, mass imbalance of the main spindle rotating part, resonance of the structure and the like are conceivable.

The clamping mechanism preferably keeps the rotational vibrations low due to the mass imbalance of the main spindle rotating part not to be increased or no resonance to be caused at specific main spindle speed, and long operational life is desirable.

In order to realize their ideal states, however, the conventional clamping mechanism has the following problems.

The disk spring for drawing up the tool holder to hold it is capable of being installed within a small space, and has an advantage of being able to exhibit a high spring force, but on the other hand, has the following problems.

(1) Since a guide clearance between the inner diameter of the disk spring and the outer diameter of the drawbar cannot be made sufficiently small, the position of its center of gravity changes due to repeated clamp/unclamp operation of the tool holder and repeated revolution/stop of the main spindle.

For the reason, even if the vibrations have been kept low by accurately modifying the mass imbalance of the entire main spindle in initialization, the maintenance and the like, discrepancy in an adjusted state due to balance modification against mass imbalance will be caused by repeating the clamp/unclamp operation or the revolution/stop of the main spindle thereafter, so that the amplitude of the vibrations will become large again.

(2) Frictional resistance to be caused among a plurality of disk springs provided causes non-uniformity to expansion and contraction strokes of the individual springs. When the expansion and contraction strokes become non-uniform, there will locally exist some disk springs having large stress amplitude among a plurality of dish springs as one set. The repetition life of the compression/release operation will become short.

(3) Since the disk spring is flat in shape, a length to guide in the axial direction in an inner diameter portion of the disk spring is short. For the reason, sliding of the disk spring in the axial direction is not smoothly performed, but an inner diameter portion of the disk spring and an outer diameter portion of the drawbar wear each other, possibly suffering damage.

As a method for solving problems resulting from the disk spring of the above-described problems (1) to (3), there has been proposed a clamping mechanism using a coil spring (See, for example, Japanese Patent Application Laid-Open No. 2000-296404).

In the clamping mechanism using the coil spring, however, the guide clearance between the inner diameter of the coil spring molded and the drawbar guide cannot be made small, every time the clamp/unclamp operation of the tool holder is repeated, and every time the revolution/stop of the main spindle is repeated, the position of the center of gravity changes. For the reason, even if the vibrations have been kept low by accurately modifying the mass imbalance of the entire main spindle, there is a problem that if the clamp/unclamp operation or the revolution/stop of the main spindle is repeated thereafter, the adjusted state due to balance modification will be out of order and the amplitude of the vibrations will become large again. Also, (4) In addition to the above-described problems, there is a problem that the position of the tool clamping mechanism always becomes unstable during revolution at high speed.

Since usually the clamping mechanism requires an operation for expanding and contracting the mechanism for the clamp/unclamp operation of a tool, the clamping mechanism is constructed to be sliding-guided with a fixed clearance with respect to the inner wall of the main spindle. This clearance causes the drawbar and the laminated disk springs to vibrate in the direction of diameter, so that the position of the tool clamping mechanism always becomes unstable, and vibrations occur. These vibrations become remarkable as the main spindle speed increases.

As a method for keeping low the vibrations of the drawbar of the above-described problem (4) in the direction of diameter, a method for providing the drawbar and the inner wall of the main spindle with thrust bearings has been disclosed in Japanese Utility Model Application Laid-Open No. 5-63701.

According to this method, it is considered possible to guide a draw bar on the inner wall of the main spindle with high accuracy without bending the drawbar during revolutions of the main spindle at high speed.

In order to make a smooth operation of the thrust bearing and the guidance of the drawbar compatible, however, there is a necessity for a minimal (for example, several μm) press-fit allowance between the outer diameter of the drawbar, the outer diameter of the ball and the inner diameter of the main spindle respectively. In order to provide such a press-fit allowance, it is necessary to manage the respective part dimensions with exceedingly high precision, leading to a problem that the cost will be increased.

SUMMARY OF THE INVENTION

The present invention relates to a clamping mechanism for a tool holder in which a drawbar is provided in a hollow part of a substantially hollow cylindrical spring so as to be able to advance and retract and coaxial with the spring, the tool holder is released by compressing the spring, and the tool holder is drawn into within the main spindle by a repulsion force generated when the compressed spring is going to restore to the original state.

In a first aspect of clamping mechanism for tool holder according to the present invention, the spring is a coil spring having a circular cross section; and the coil spring has been constructed such that a cylindrical removal work has been performed on the spiral inner wall of the coil spring in the spiral axial direction and that the inner diameter is larger than the outer diameter of the drawbar by a predetermined amount.

The removal work may be performed in a state in which the coil spring is compressed to the length at which the coil spring is used In a second aspect of the clamping mechanism for tool holder according to the present invention, the spring is a coil spring having a circular cross section; and the coil spring is such that in a compressed state, the inner diameter is larger than the outer diameter of the drawbar, and moreover, a difference between the inner diameter of the coil spring and the outer diameter of the drawbar is 0.1 mm or less.

In the first and second aspects of the clamping mechanism for tool holder according to the present invention, a coil spring is used for the spring for sliding the drawbar; the removal work for keeping the inner diameters of the coil springs aligned is performed such that the clearance between the outer diameter of the drawbar and the inner diameter of the coil spring becomes a minimum; and the coil springs are caused to be guided integrally with the drawbar. By doing so, the movement of the center of gravity of the spring that is caused by repeated rotational operation of the main spindle or repeated tool clamping operation will be reduced and the vibrational amplitude will be made smaller. Also, the coil spring is made to have a circular cross section instead of a square cross section to thereby enhance the durability.

In a third aspect of the clamping mechanism for tool holder according to the present invention, the clamping mechanism for tool holder has pressing means for pressing the drawbar against the inner wall of the main spindle at a part in one direction of the direction. By elastically pressing one part of the drawbar against the inner wall of the main spindle which guides the draw bar, in one radial direction by means of this pressing means, the drawbar is caused to be integrally held by the main spindle, and as a result, the vibration level can be kept low within all the rotational speed region from low speed to maximum speed.

The pressing means may be comprised of an O-ring groove provided at the outer periphery of an axial member provided coaxial with the drawbar, and an O-ring to be installed into the O-ring groove; and distribution of the repulsion force of the O-ring is made non-uniform over a circumference whose center is the axial center of the main spindle.

Further, the pressing means may be a spring mechanism provided between an axial member provided coaxial with the drawbar and the inner wall of the main spindle which houses the axial member therein; and the spring mechanism elastically presses the axial member against the inner wall of the main spindle at a part in one direction.

Also, the present invention allows the third aspect to be incorporated into the first aspect.

Further, the method for forming a spring used in the clamping mechanism for tool holder according to the present invention comprises the steps of: compressing the coil spring having a circular cross section to a state in which the tool holder is held; and performing the removal work on the spiral inner wall of the coil spring in the compressed state in the spiral axial direction in a cylindrical shape, thereby making the inner diameter of the coil spring larger than the outer diameter of the drawbar and making the difference between the inner diameter of the coil spring and the outer diameter of the drawbar 0.1 mm or less.

Through the use of this spring forming method, it is possible to machine such that the clearance between the outer diameter of the drawbar and the inner diameter of the spring becomes a minimum in a holding state for actually holding the tool holder.

According to the present invention, it is possible to reduce the change in the position of center of gravity for restraining the vibrations. It is possible to reduce the stress amplitude with the expansion and contraction stroke uniform for enhancing the durability. The abrasion can be reduced by the stable sliding state. Further, the guide clearance can be reduced and the vibrations can be restrained.

BRIEF DESCRIPTION OF THE DRAWINGS

The foregoing and other purposes, aspects and advantages of the present invention will be better understood from the following description of preferred embodiments with reference to the attaching drawings, in which:

FIGS. 2A to 2C are views for explaining the structure of a coil spring in the clamping mechanism of FIG. 1;

FIG. 3 is a cross section showing a nut in the clamping mechanism of FIG. 1 and an O-ring groove formed in the nut;

FIGS. 4A to 4C are views for explaining some installation examples of pressing means in the clamping mechanism of FIG. 1.

DETAILED DESCRIPTION OF THE PREFERRED EMBODIMENTS

Figure 1:
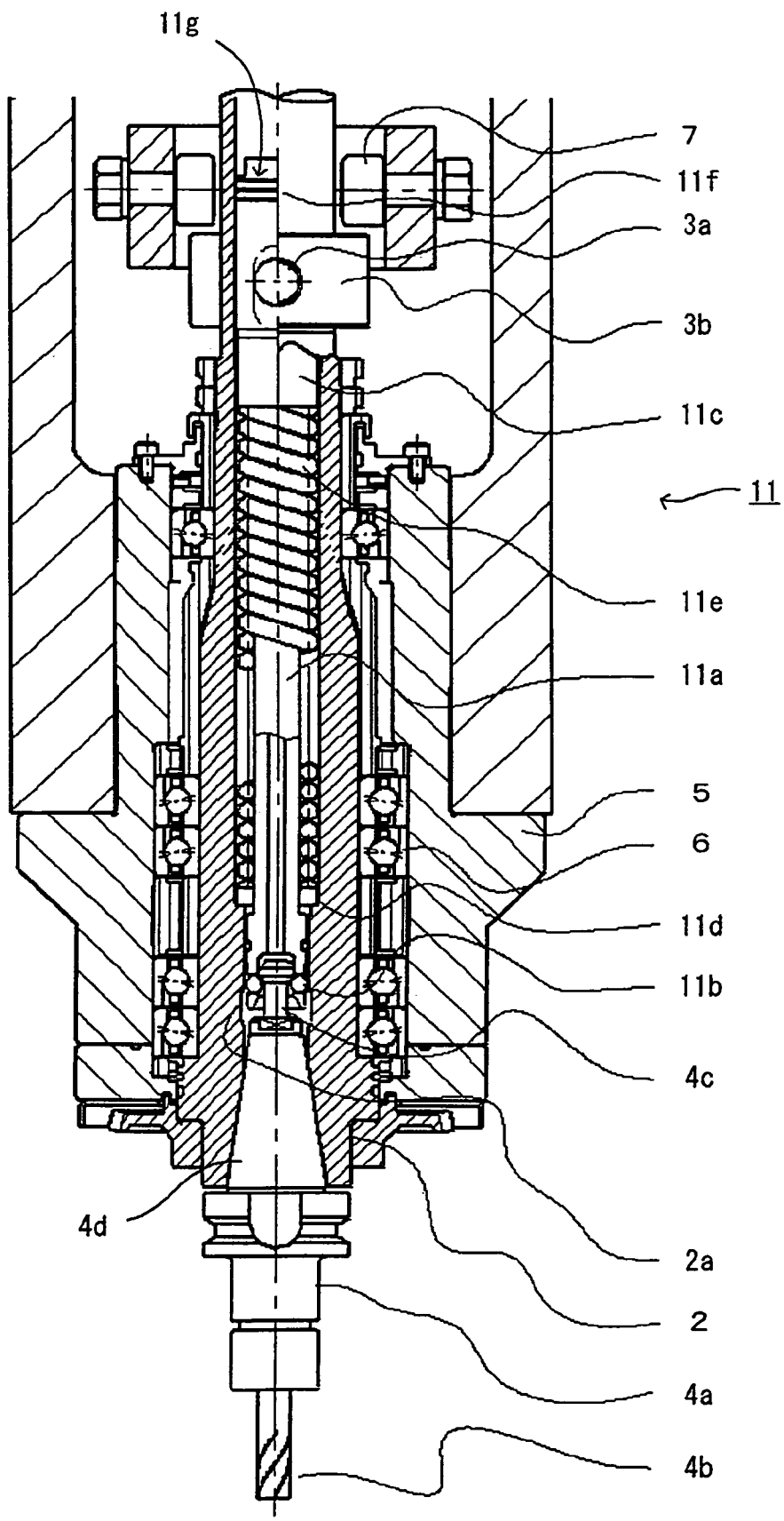
FIG. 1 is a view for explaining a clamping mechanism for tool holder according to the present invention.

FIG. 1 is a view for explaining a clamping mechanism for tool holder according to the present invention.

In a housing 5 to be mounted on the spindle head and the like, a main spindle 2 has been rotatively supported via a bearing 6. Within a hole provided along the axial center of the main spindle 2, a clamping mechanism 11 is arranged via a pull stud 4c. The pull stud 4c is a pillared member for connecting the tool holder to the clamping mechanism 11 to draw the tool holder in, and has been installed to the tip of the drawbar 11a for constituting the clamping mechanism 11.

The clamping mechanism 11 has a drawbar 11a, a steel ball 11b, a nut 11c coupled to the drawbar 11a, a seat plate 11d, a coil spring 11e and an O-ring 11f.

In the clamping mechanism 11, at one end of the drawbar 11a, a pull stud 4c is provided, while at the other end thereof, a nut 11c is provided, and the drawbar 11a is movably (up-and-down movements) mounted in a hole formed along the axial center of the main spindle 2. The drawbar 11a is supported by sliding between steel balls 11b provided at one end of the main spindle on the pull stud 4c side and the inner wall of the main spindle 2.

Within the hole of the main spindle 2 in the axial direction, a coil spring 11e is provided together with the drawbar 11a. The coil spring 11e is arranged between the outer periphery of the drawbar 11a and the inner wall of the main spindle 2 so as to cover the drawbar 11a in the axial direction, the lower end on the tool holder side abuts against a shoulder portion formed on the main spindle 2 via the seat plate 11d, and the upper end abuts against the nut 11c. In this case, abutting of the coil spring 11e at both ends is performed by the repulsion force when the compressed coil spring 11e expands.

Also, at the end portion of the hole of the main spindle 2 on the tool holder side, an air gap 2a is formed. When the drawbar 11a is caused to move up and down with in the main spindle 2, the pull stud 4c at the lower end of the drawbar 11a moves up and down within the air gap 2a. When it has been moved upward in this up-and-down movement, the pull stud 4c moves in a direction to be drawn into the hole of the main spindle 2 to thereby hold the tool holder. Also, when it has been moved downward, the pull stud 4c moves in a direction to be pushed out toward the outside from within the hole of the main spindle 2 to thereby open the tool holder.

At the top end of the drawbar 11a, the nut 11c is mounted, and to this nut 11c, the ring 3b is mounted via the rod 3a. Further, at a position above the ring 3b, a roller 7 has been provided.

The nut 11c receives an upward force by a repulsion force by the compressed coil spring 11e to cause the ring 3b to abut against the roller 7 via the rod 3a, stopping at a predetermined position to be determined by the position of the roller 7. At this time, the pull stud 4c holds the tool holder in a state in which it has been drawn in.

When the roller 7 is driven by a driving mechanism (not shown) from this state to depress the ring 3b downward, the ring 3b pressed depresses the nut 11c downward via the rod 3a. At this time, the nut 11c has been pressed upward by the repulsion force of the coil spring lie compressed, but the driving of the roller 7 depresses the drawbar 11a downward via the nut 11c against the repulsion force of compression of the coil spring 11e.

The drawbar 11a depressed presses the steel ball 11b which holds the pull stud 4c at the lower end into the air gap 2a. Thereby, the tool holder is opened.

Also, on the outer periphery portion of the nut 11c, an O-ring groove 11g is formed, and within the O-ring groove 11g, an O-ring 11f is mounted. Thereby, the O-ring 11f is provided between the outer periphery of the nut 11c and the inner wall of the main spindle 2 to press the nut 11c against the inner wall of the main spindle at a part in one radial direction. The nut 11c is pressed against the inner wall of the main spindle 2, whereby the drawbar 11a provided contiguously to the nut 11c in the axial direction is pressed against the inner wall of the main spindle 2. Therefore, an O-ring groove 11g constitutes pressing means for pressing the drawbar 11a against the inner wall of the main spindle 2. By means of this pressing means, it becomes possible to set a guide clearance between the main spindle 2 and the nut 11a to substantially 0, whereby it becomes possible to restrain to a low vibration level within the full speed region from low speed revolution to high speed revolution.

Also, since the pressing means has simple structure for forming the O-ring groove 11g merely to only mount the O-ring 11f, it does not necessitate strict dimensional management, but the vibrations during high speed revolution of the main spindle can be effectively kept low without causing any disadvantage even in cost.

In this respect, the tool holder is composed of the main body 4a of a tool holder for holding a tool such as a cutter 4b, a pull stud 4c, and a tool shank 4d. The tool shank 4d is inserted into an end portion open end of the main spindle 2 by an automatic tool exchanger and the steel ball 11b is extended by the pull stud 4c at the upper end to thereby mount the tool.

Next, the description will be made of the structure of the coil spring for lifting the drawbar upward, in a clamping mechanism according to the present invention, with reference to FIGS. 2A to 2C.

FIG. 2A shows a state in which a piece of spring material is molded into a coil shape to be made into a coil spring. During this molding, a comparatively large coil pitch is used. Also, the coil end is finished as an open end.

In this case, the coil spring is capable of acquiring sufficient durability life through the use of spring material having a circular cross section. In spring material of music wire, silicon chrome steel or the like having a circular cross section, the life can be correctly forecast, and it can be regarded as permanent life in design.

Next, in a state in which a molded coil spring 11d is compressed, a cylindrical removal work is performed in the spiral axial direction on the spiral inner wall of the coil spring 11d. When the coil spring 11d is placed in a compressed state, the inner diameter will be enlarged. For the reasons, if the inner diameter of the coil spring 11d is determined in a state where it is not yet compressed, a clearance dimension between the outer wall of the drawbar and the inner wall of the coil spring will become large when the coil spring is mounted onto the drawbar to be used under a compressed state, to become a main factor for vibrations.

According to the present invention, molded coil spring is compressed over the full length in the same manner as during actual use, and in this compressed state, an inner diameter portion of the spring is finished by polishing. By doing so, the clearance between the outer wall of the drawbar and the inner wall of the spring will be caused to become a minimum in a state in which the tool holder is actually held.

For example, the spiral inner wall of the spring is finished by polishing, whereby it becomes possible to reduce a difference between the outer diameter D of the drawbar 11a and the inner diameter d of the coil spring 11d to 0.1 mm or less, as shown in FIG. 2B.

Further, the coil spring according to the present invention is capable of being comprised of a plurality of pieces of spring material. As shown in, for example, FIG. 2C, two pieces of coil springs 11d1 and 11d2 having the same coil diameter are incorporated into each other between the spirals of the other party, thereby forming concentric parallel springs. Thereby, it becomes possible to exhibit a clamping force corresponding to the disk spring within the same installation space as that for a disk spring.

Figure 5:
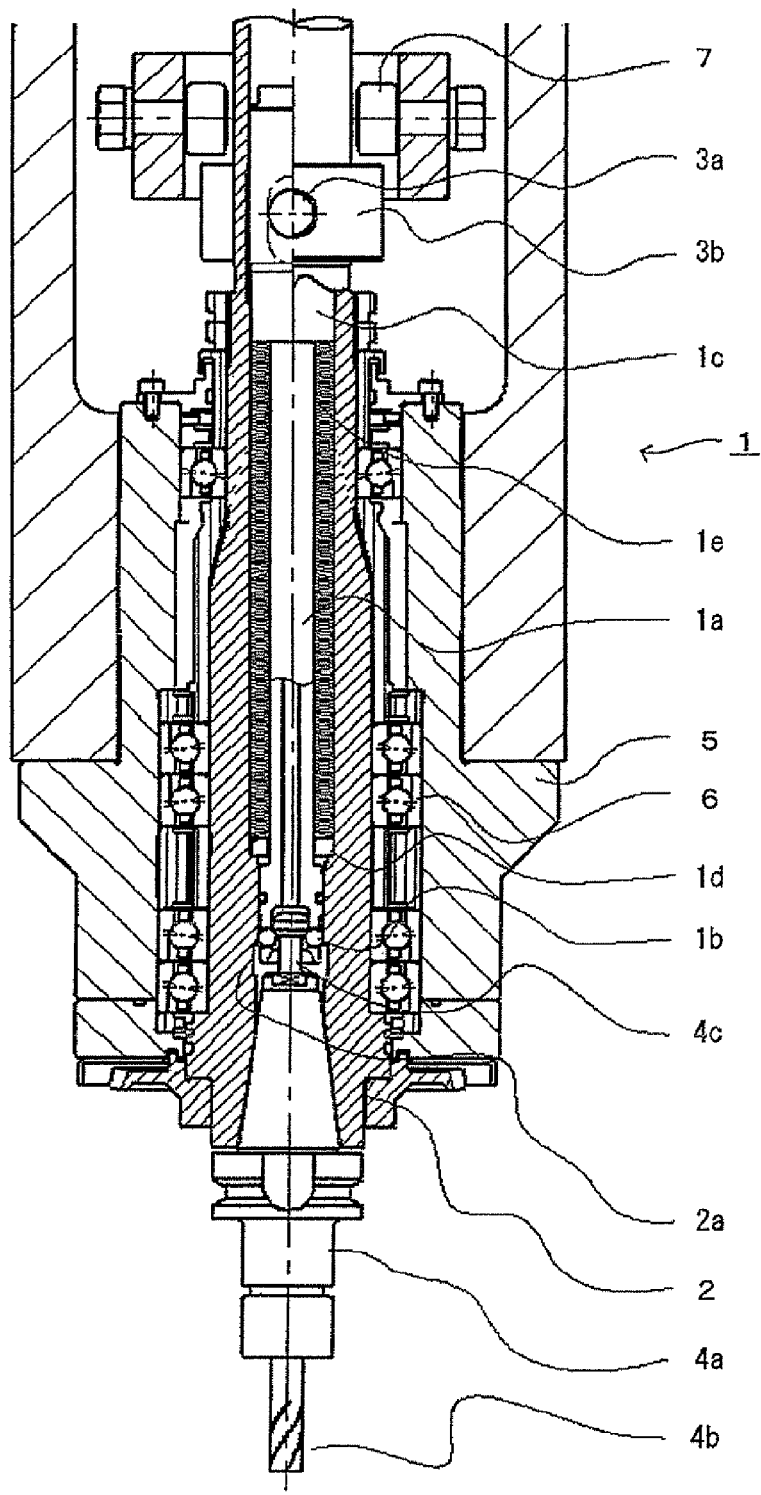
FIG. 5 is a view showing one structural example of a main spindle mechanism using a conventionally-known clamping mechanism.

Next, with reference to FIGS. 3 to 5, the description will be made of a structural example in which the drawbar is pressed against the inner wall of the main spindle.

As described above, an O-ring groove 11g is formed on the outer periphery of the nut 11c, and an O-ring 11f is installed into this O-ring groove 11g. In this case, in order to press the nut and the drawbar against the inner wall of the main spindle, the distribution of repulsion force by the O-ring 11f is made non-uniform with respect to the axial center. Making the distribution of repulsion force non-uniform wit respect to the axial center, the nut and the drawback are pressed against the inner wall of the main spindle at a part in one radial direction.

As the structure in which the distribution of repulsion force of the O-ring is made non-uniform with respect to the axial center, it is possible to keep the center of, for example, the O-ring groove apart from the center of an axial member provided coaxially to the drawbar, or to make the depth of the O-ring groove different in accordance with an angular position of the O-ring groove.

FIG. 3 is a sectional view showing the nut 11c and the O-ring groove 11g formed on the nut 11c. Within a range of an angle A on the nut 11c, the depth of the O-ring groove 11g is "a" (made shallow), while within a range of an angle B, the depth of the O-ring groove 11g is "b" (made deeper).

Thus, when the O-ring 11f is installed within this O-ring groove 11g and the drawbar 11a is installed in to the main spindle 2, a repulsion force that is generated between the O-ring 11f and the inner wall of the main spindle 2 will become non-uniform along over the circumference as shown in "O-ring pressure distribution" of FIG. 3. Since this non-uniform distribution of repulsion force causes a force for pressing the left inner wall to become greater than a force for pressing the right inner wall in FIG. 3, the nut 11c will be pressed against the inner wall of the main spindle in the right direction in the figure.

In this respect, the pressing means is not limited to the structure using the repulsion force of the O-ring, but structure using the repulsion force of a spring can be adopted. Any structure may be applied to such pressing means as far as the vibrations can be kept low by elastically pressing the drawbar against the inner wall of the main spindle so that the draw bar and the main spindle rotate integrally during revolution of the main spindle.

Also, a number of pressing means to be mounted to the clamping mechanism or a number of points of contact that the drawbar comes into contact with the inner wall of the main spindle can be arbitrarily set.

FIGS. 4A to 4C are views for explaining some installation examples of the pressing means.

FIG. 4A shows a state in which the nut 11c is pressed against the inner wall of the main spindle 2 by one pressing means and contact is performed at one point of contact.

Also, FIG. 4B shows a state in which the nut 11c is pressed against the inner wall of the main spindle 2 by a plurality of pressing means (two pressing means here) and contact is performed at one point of contact.

Also, FIG. 4C shows a state in which the nut 11c is pressed against the inner wall of the main spindle 2 by one pressing means and contact is performed at a plurality of points of contact (two points of contact here). In this respect, in the example of FIG. 4C, a plurality of pressing means may be used.

According to one aspect of the present invention, the following operation can be made through the use of a coil spring characteristic of the present invention, in place of the disk spring.

In the present invention, the same spring force as the disk spring can be obtained through the use of a double coil spring.

Also, according to the present invention, machining is performed such that the clearance between the inner diameter of the coil spring and the outer diameter of the drawbar becomes sufficiently small, whereby when the clamp/unclamp operation of the tool holder is repeated, or even when the rotation/stop of the main spindle is repeated, it is possible to make a change in position of center of gravity exceedingly small, and to keep the vibrations low.

Also, according to the present invention, the structure using the double coil spring is adopted and no frictional resistance between individual springs is generated, so that it is possible to make the expansion and contraction stroke uniform over the full length of the spring and to enhance the durability. As regards the durability, it has been confirmed in the durability test that it exhibits a sufficient durability life for a long time period, considering a design life calculated from the stress amplitude as a permanent life.

Also, the coil spring according to the present invention has an effect that no partial contact occurs because the contact state of the inner diameter of the coil spring is continuous in a spiral fashion in the axial direction. Thereby, it has been confirmed that stable sliding state is obtained and no abnormal abrasion occurs.

According to one aspect of the present invention, it is constructed to have a mechanism in which the nut of the clamping mechanism is elastically pressed against the main spindle, whereby the following operation can be preformed.

By providing a mechanism for pressing against, the clamping mechanism according to the present invention is capable of setting a guide clearance between the main spindle and the nut to substantially 0, whereby it becomes possible to restrain to a low vibration level within the full speed region of the main spindle speed from low speed revolution to high speed revolution.

Also, since the mechanism for pressing against is simple in structure in the clamping mechanism according to the present invention, there is no need for strict dimensional management, as a result, the vibrations during high speed revolutions of the main spindle can be effectively kept low without causing any disadvantages even in cost.

The invention claimed is:

1. A clamping mechanism for a tool holder in which a drawbar is provided in a hollow part of a substantially hollow cylindrical spring so as to be able to advance and retract and coaxial with the spring, the tool holder is released by compressing the spring, and the tool holder is drawn into within a main spindle by a repulsion force of the spring, wherein
   said spring is a coil spring, the wire of which having a circular cross section; and
   said coil spring has been constructed such that a cylindrical removal work has been performed on the spiral inner wall of the coil spring in the spiral axial direction and that the inner diameter of the spring is larger than the outer diameter of the drawbar by a predetermined amount.

2. A clamping mechanism for a tool holder in which a drawbar is provided in a hollow part of a substantially hollow cylindrical spring so as to be able to advance and retract and coaxial with the spring, the tool holder is released by compressing the spring, and the tool holder is drawn into within a main spindle by a repulsion force generated when the compressed spring is going to restore to an original state, wherein
   said spring is a coil spring, the wire of which having a circular cross section;
   said coil spring has been constructed such that a cylindrical removal work has been performed on the spiral inner wall of the coil spring in the spiral axial direction; and
   said coil spring is such that in a compressed state, the inner diameter of the spring is larger than the outer diameter of the drawbar, and moreover, a difference between the inner diameter of the coil spring and the outer diameter of the drawbar is 0.1 mm or less.

3. A clamping mechanism for a tool holder in which a drawbar is provided in a hollow part of a substantially hollow cylindrical spring so as to be able to advance and retract and coaxial with the spring, the tool holder is released by compressing the spring, and the tool holder is drawn into within a main spindle by a repulsion force of the spring, comprising:

pressing means for pressing said drawbar against the inner wall of the main spindle at a part in one radial direction;

wherein said spring is a coil spring, the wire of which has a circular cross section; and said coil spring has been constructed such that a cylindrical removal work has been performed on the spiral inner wall of the coil spring in the spiral axial direction.

4. A clamping mechanism for a tool holder in which a drawbar is provided in a hollow part of a substantially hollow cylindrical spring so as to be able to advance and retract and coaxial with the spring, the tool holder is released by compressing the spring, and the tool holder is drawn into within a main spindle by a repulsion force of the spring, wherein said spring is a coil spring, the wire of which having a circular cross section; said coil spring has been constructed such that a cylindrical removal work has been performed on the spiral inner wall of the coil spring in the spiral axial direction and that the inner diameter of the spring is larger than the outer diameter of the drawbar by a predetermined amount; and there is provided pressing means for pressing said drawbar against the inner wall of the main spindle in one direction of the direction of the radius of the drawbar.

5. The clamping mechanism for a tool holder according to claim 1 or 4, wherein said removal work is performed in a state in which the coil spring is compressed to the length at which the coil spring is used.

6. The clamping mechanism for a tool holder according to claim 3 or 4, wherein said pressing means is comprised of an O-ring groove provided at the outer periphery of an axial member provided coaxial with said drawbar, and an O-ring to be installed into the O-ring groove, and distribution of the repulsion force of said O-ring is made non-uniform over a circumference whose center is the axial center of said main spindle.

7. The clamping mechanism for a tool holder according to claim 6, wherein the center of said O-ring groove is kept apart from the center of said axial member, whereby distribution of the repulsion force of said O-ring is made non-uniform over a circumference whose center is the axial center of said axial member.

8. The clamping mechanism for a tool holder according to claim 6, wherein the depth of said O-ring groove in the axial member varies.

9. The clamping mechanism for a tool holder according to claim 3 or 4, wherein said pressing means is a spring mechanism provided between an axial member provided coaxial with said drawbar and the inner wall of the main spindle which houses the axial member therein, and said spring mechanism elastically presses said axial member against the inner wall of the main spindle at a part in one direction.

10. The clamping mechanism for a tool holder according to any of claims 1 to 4, wherein said spring is a coil spring formed of a plurality of pieces of spring material.

11. The clamping mechanism for a tool holder according to claim 10, wherein said coil spring is a parallel spring with each piece of spring material having the same diameter and being coaxial, the parallel spring formed by incorporating two pieces of coil springs into each other between the spirals of the other party.

12. A method for forming a spring to be used in the clamping mechanism for a tool holder in which a drawbar is provided in a hollow part of a substantially hollow cylindrical spring so as to be able to advance and retract and coaxial with the spring, the tool holder is released by compressing the spring, and the tool holder is drawn into within a main spindle by a repulsion force of the spring, comprising the steps of:

compressing the coil spring, the wire of which having a circular cross section, to a state in which the tool holder is held; and performing the removal work on the spiral inner wall of the coil spring in the compressed state in the spiral axial direction in a cylindrical shape, thereby making the inner diameter of the coil spring larger than the outer diameter of the drawbar and making the difference between the inner diameter of the coil spring and the outer diameter of the drawbar 0.1 mm or less.

* * * * *

UNITED STATES PATENT AND TRADEMARK OFFICE
CERTIFICATE OF CORRECTION

PATENT NO. : 7,418,783 B2  Page 1 of 1
APPLICATION NO. : 11/216091
DATED : September 2, 2008
INVENTOR(S) : Akihiko Fujimoto et al.

It is certified that error appears in the above-identified patent and that said Letters Patent is hereby corrected as shown below:

Column 1, Line 46, after "Thereby" insert --,--.

Column 3, Line 35, after "used" insert --.--.

Column 5, Line 27, change "with in" to --within--.

Column 5, Line 50, change "lie" to --11e--.

Column 7, Line 23, change "in to" to --into--.

Column 8, Line 25, change "preformed." to --performed.--.

Signed and Sealed this

Twenty-seventh Day of January, 2009

JOHN DOLL
*Acting Director of the United States Patent and Trademark Office*